United States Patent

Walter

[11] 4,052,241

[45] Oct. 4, 1977

[54] METHOD OF FORMING A CONTOURED LAMINATE

[75] Inventor: William J. Walter, Algonac, Mich.

[73] Assignee: Detroit Gasket and Manufacturing Company, Detroit, Mich.

[21] Appl. No.: 631,794

[22] Filed: Nov. 13, 1975

[51] Int. Cl.² .................................... B29C 17/04
[52] U.S. Cl. .......................... 156/245; 156/285; 264/92; 264/278; 296/137 A; 427/207 R
[58] Field of Search .............. 156/285, 286, 245, 84, 156/299, 212, 381, 382; 214/1; 428/172; 264/90, 92, 266, 278; 427/207; 296/137 A, 137 R; 425/389, 390

[56] References Cited

U.S. PATENT DOCUMENTS

| | | | |
|---|---|---|---|
| 1,458,732 | 6/1923 | Sloper | 156/84 |
| 2,361,343 | 10/1944 | Dickson et al. | 264/278 |
| 3,072,520 | 1/1963 | Groth | 156/286 |
| 3,325,329 | 6/1967 | Bolesky | 156/285 |
| 3,554,834 | 1/1971 | Bennett et al. | 156/285 |
| 3,556,315 | 1/1971 | Berger | 214/1 |
| 3,589,967 | 6/1971 | Shirakawa | 156/285 |
| 3,654,012 | 4/1902 | Schlager | 156/285 |
| 3,654,019 | 4/1972 | Cusick | 156/282 |
| 3,657,044 | 4/1972 | Singer | 156/285 |

*Primary Examiner*—Charles E. Van Horn
*Assistant Examiner*—Jerome W. Massie
*Attorney, Agent, or Firm*—Cullen, Settle, Sloman & Cantor

[57] ABSTRACT

A method of bonding a flexible superstrate, such as a flexible finish sheet, to a contoured substrate, such as a contoured fiberboard, particularly in mass production. The disclosed method includes supporting the contoured substrate in a downwardly facing cavity of a female die. The substrate may be coated with adhesive before receipt in the die cavity. A flexible superstrate is then positioned beneath the die cavity on a flexible sealing sheet. The die is then closed and a vacuum is drawn through the die cavity and contoured substrate to draw the sealing sheet into the die cavity. The flexible superstrate or finish sheet is thus drawn in face-to-face contact with the contoured face of the substrate, bonding the finish sheet to the substrate.

7 Claims, 4 Drawing Figures

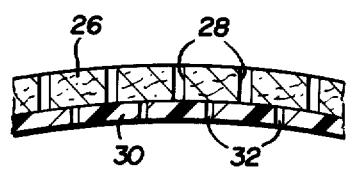
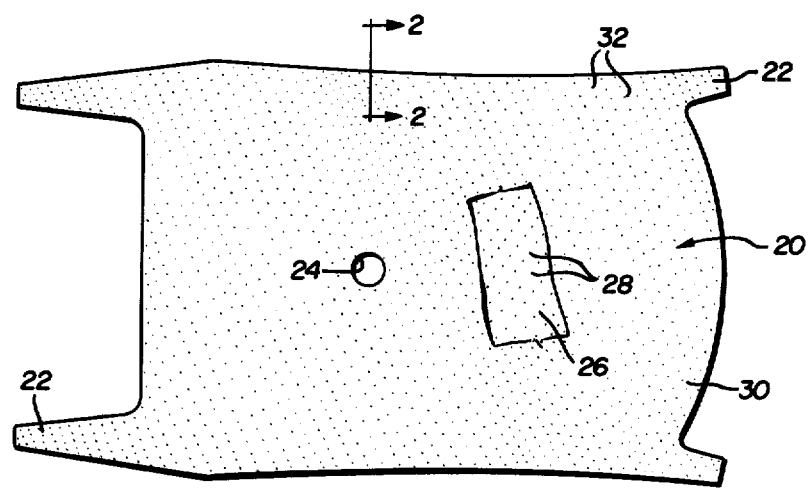

METHOD OF FORMING A CONTOURED LAMINATE

FIELD OF THE INVENTION

A method of bonding a finish sheet to a contoured substrate. The method of this invention is particularly adapted to forming a laminated automotive headliner, which may include a perforated hardboard substrate contoured in shape to fit the interior roof configuration and a flexible finish sheet, such as vinyl.

DESCRIPTION OF THE PRIOR ART

The prior art discloses various methods of forming using vacuum dies or molds. Generally, the sheet to be vacuum formed is retained in a frame assembly, heated and formed. U.S. Pat. No. 3,654,012 discloses a method of forming a ship hull, including a thermoplastic sheet which is formed on a boat hull including the steps of drawings the skin into the hull. The prior art does not however disclose a method suitable for mass production of bonding a sheet to a contoured substrate without the requirement of a frame or hand application.

It would be possible to form the automotive headliner laminate by supporting the finish sheet in a suitable frame over a female die containing the contoured substrate, which has been coated with a suitable adhesive, and then drawing a vacuum through the female die to bond the finish sheet to the substrate. This would not be possible however where the finish sheet is perforated, then requiring either a male die to form the finish sheet into the substrate or an imperforate sheet in the frame assembly. This method would be time-consuming, requiring framing of the finish sheet and a waste of material, because the portion of the finish sheet retained in the frame cannot be bonded to the substrate.

U.S. pat. No. 3,878,010 discloses a method and apparatus for adhesively bonding a roof-covering to an automotive vehicle roof, wherein a vacuum is applied across the female mold to hold the roof covering in the configuration of the roof as the covering is removed from the roof during bonding. This patent, therefore, does not disclose the method of this invention. U.S. Pat. No. 2,620,289 and 3,867,240 also disclose methods and apparatus for vacuum forming articles other than automotive headliners.

SUMMARY OF THE INVENTION

In the method of this invention, the preformed contoured substrate is supported within the die cavity of a female die overlying the flexible superstrate or finish sheet. The finish sheet is supported on a flexible impervious sealing sheet. In the preferred embodiment of the apparatus, the female die includes a peripheral sealing edge confronting the flexible sealing sheet, surrounding the finish sheet. The impervious sealing sheet may be supported on a suitable support, such as a table, having perforations through the support.

A suitable adhesive is applied to one of the confronting faces of the substrate or superstrate. In the preferred method of this invention, the adhesive is aplied to the contoured substrate, prior to supporting the substrate in the die cavity. The die cavity is then sealed by contacting the die sealing edge and the flexible seal, such as by closing or lowering the upper die into contact with the flexible seal. A vacuum is then drawn through the upper die and substrate, drawing the flexible seal into the upper die cavity and the superstrate or finish sheet into face-to-face contact with the contoured substrate, bonding the superstrate to the substrate. The upper die may then be raised and the bonded laminate removed.

Where the substrate is a partially self-supporting structure, such as an automotive headliner, the headliner substrate is preferably releasably supported within the die cavity. In the disclosed embodiment of the apparatus, the headliner substrate is supported within the die cavity on retractable pins or elements, the die is closed and the pins are retracted to release the headliner substrate within the die cavity. This method avoids tearing of the finish sheet when the vacuum is drawn through the substrate. The headliner substrate cannot be simply supported on the finish sheet because the substrate would expand or sag beyond the contour of the die cavity.

The method of this invention thus eliminates the requirement of stretching the flexible finish sheet in a frame or on pins overlying a female die and permits the utilization of almost any flexible finish sheet and substrate. Other advantages and meritorious features of the present invention will be more fully understood from the following description of the method of this invention, the appended claims and the drawings, a description of which follows.

BRIEF DESCRIPTION OF THE DRAWINGS

FIG. 1 is an elevation of an automotive headliner viewing the convex side;

FIG. 2 is a cross sectional view of the headliner shown in FIG. 1, in the direction of view arrows 2—2;

DESCRIPTION OF THE PREFERRED METHOD OF THIS INVENTION

Figure 3:
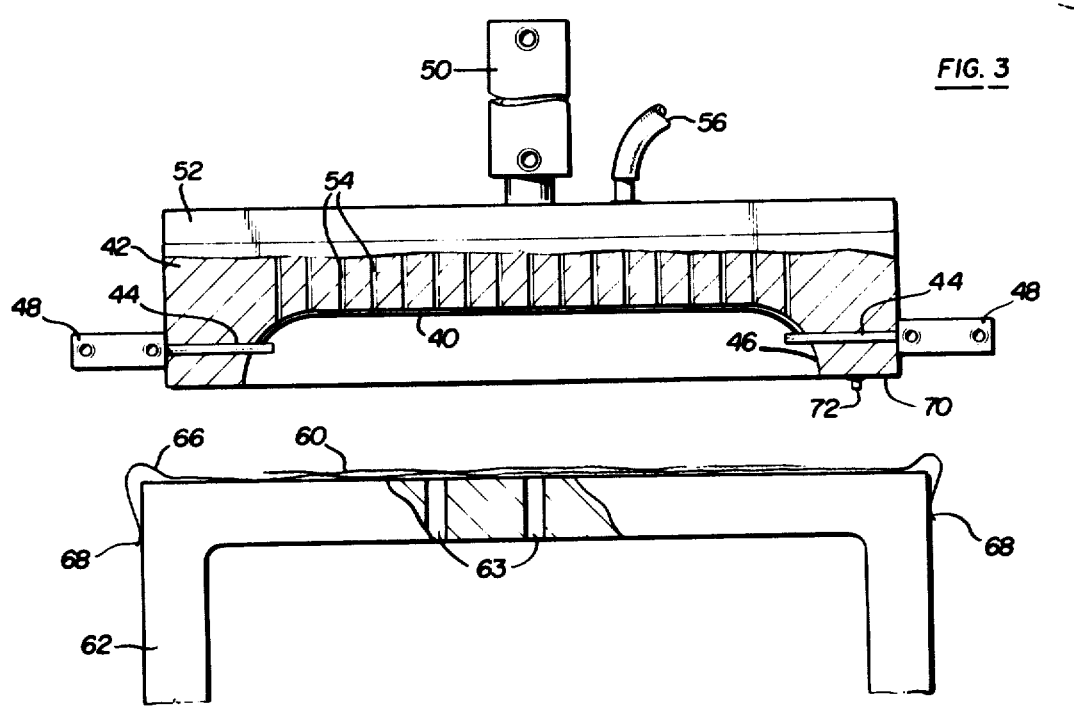
FIG. 3 is a partially cross sectioned schematic view of an apparatus for carrying out the method of this invention.

FIGS. 1 and 2 illustrate a conventional automotive headliner 20 which may be formed by the method of this invention. The headliner is generally concave to conform to the interior surface of the passenger compartment roof and generally includes longitudinally projecting wings 22 at each of the headliner corners which cover the supporting columns of the automotive roof. It will be understood that the configuration of the headliner will depend upon the particular application and the configuration of the roof. The disclosed embodiment of the headliner also includes a dome light opening 24 which receives the dome light in the conventional automobile. The construction of the disclosed headliner is best shown in FIG. 2. It will be seen that the disclosed embodiment of the headliner includes a relatively self-supporting substrate sheet 26 having a plurality of perforations 28 and a flexible finish sheet 30, which is also perforated at 32 in this embodiment.

An automotive headliner is generally supported along the edges on a ledge or channel adjacent the roof in the passenger compartment. The headliner must therefore be self-suporting, particularly between the side edges. The headliner must also be sufficiently resilient or flexible to be received within the passenger compartment during installation. The materials must therefore be chosen to provide sufficient flexibility to receive the headliner within the automotive passenger compartment and be self supporting after installation. The purpose of an automotive headliner is to absorb interior and exterior sound or provide sound attenuation, absorb shock and to improve the appearance of the passenger compartment. A suitable substrate sheet 26 may be formed from perforated hardboard, tagboard or various composites including fiberglass. The finish sheet 30 may be a vinyl or polyurethane sheet which is bonded to the substrate 26. The superstrate 30 may also be a laminate, such as a polyurethane film having a polyurethane foam backing which is bonded to the substrate. The method of this invention is particularly concerned with the formation of a contoured laminate, such as the automotive headliner shown in FIGS. 1 and 2.

In the apparatus shown in FIG. 3, the contoured substrate 40 is releasably supported in the cavity 46 of a female die 42. Where an automotive headliner is being formed, such as shown in FIGS. 1 and 2, the substrate 40 may be a perforated hardboard, as described, which has been previously formed into the desired concave-convex configuration. In a typical commercial application, a fiberboard sheet is perforated and formed in a steam press which permanently forms the fiberboard into the desired shape.

In the disclosed apparatus, the substrate sheet 40 is retained within the die cavity 46 on a plurality of retractable pins 44 which may be extended into the die cavity 46 or retracted by hydraulic cylinders 48 or the like. The upper die 42 in the disclosed embodiment is supported on a conventional extensible hydraulic ram 50 which is connected to the die platten 52. The ram is connected at its upper end to a suitable support, not shown, permitting raising and lowering of the upper die, as described hereinbelow. The die 42 includes a plurality of vacuum holes 54 which are interconnected to a suitable source of vacuum through vacuum line 56. Other details of the female die assembly may be conventional and will be understood by those skilled in the art.

The superstrate or finish sheet 60 is supported beneath the die cavity 46 on a suitable support, such as the table 62 illustrated. The support preferably includes a plurality of perforations 63 for the purposes stated hereinbelow. The upper surface of the support includes a flexible impervious sealing sheet 66, such as synthetic or natural rubber, which is retained to the support by any suitable means along its side edges 68.

The method of this invention then includes supporting the contoured substrate 40 within the cavity 46 of a female die 42 and positioning the flexible superstrate or finish sheet 60, beneath the die cavity 46, on a flexible sealing sheet 66. In the disclosed embodiment, the contoured substrate 40 is a relatively flexible perforated fiberboard sheet and therefore the substrate may be inserted within the die cavity without retracting pins 44. Alternatively, pins 44 may be retracted by operation of cylinders 48. The contoured substrate may then be inserted into the mold cavity and the pins 44 extended. In a typical headliner application, four pins support the headliner substrate 40, two on each side.

The upper die 42 is then lowered by ram 50 to engage the peripheral sealing edge 70 against the flexible sealing sheet 66 surrounding the finish or superstrate sheet 60. A vacuum may then be drawn through the female die 42 as shown in FIG. 4 and described hereinbelow.

In the disclosed embodiment of the apparatus, the support pins 44 are preferably retracted prior to drawing a vacuum to prevent tearing of the flexible sealing sheet 66 and superstrate 60. The substrate 40 will drop slightly, but will be supported against the sealing sheet 66 by the wings 22; see FIG. 1. The substrate cannot be simply supported on the sealing sheet 66, prior to the closing of the die 42, because the substrate will sag and expand slightly, preventing closing of the die against the sealing sheet. After closing, however, the substrate will be supported against the side walls of the die cavity. A switch 72 is provided in the disclosed embodiment of the apparatus, as shown in FIG. 3, which automatically actuates cylinder 48 to retract pins 44 upon closing of the die. This switch may also be timed to automatically begin drawing a vacuum across the female die, following retraction of support pins 46.

A vacuum is then drawn through the female die 42, through vacuum holes 54 and through the substrate 40. As described above, the disclosed embodiment of the substrate includes a plurality of perforations 28, however the substrate does not have to be perforated in the disclosed method. Where the substrate is imperforate, the vacuum may be drawn through any aperture in the substrate, such as the dome light opening 24, as shown in FIG. 1, or the vacuum may be drawn around the substrate.

Figure 4:
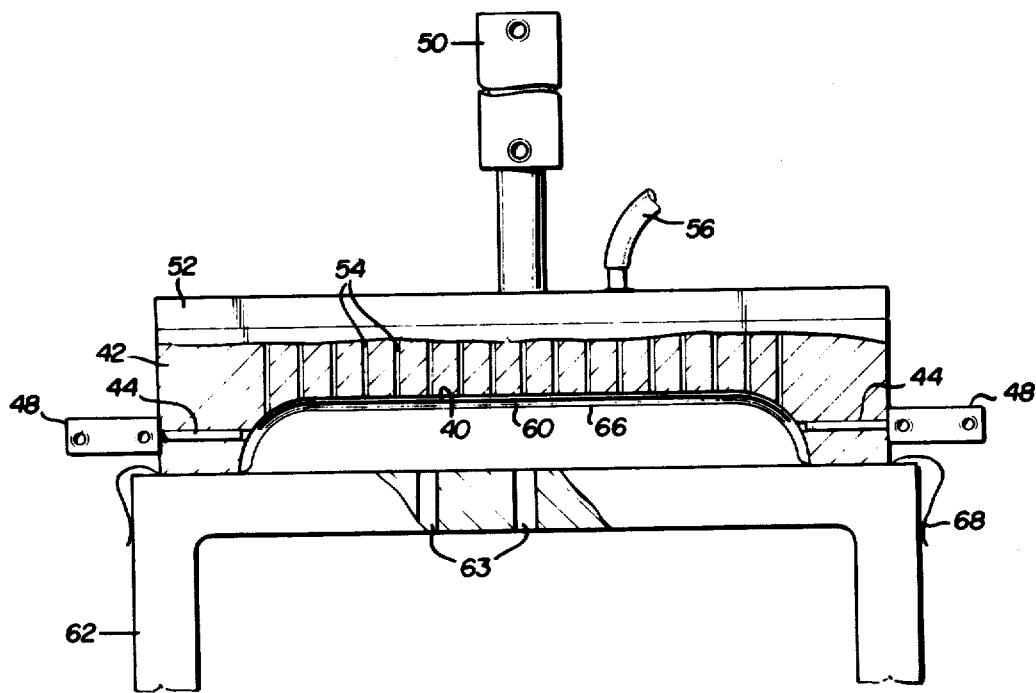
FIG. 4 is a view of the apparatus shown in FIG. 3, later in the bonding method.

As shown in FIG. 4, the flexible sealing sheet 66 is drawn by the vacuum into the die cavity, bringing the superstrate or finish sheet 60 into face to face contact with the convex face of the substrate sheet 40. As described, an adhesive coating has been applied to one of the confronting faces of the substrate or superstrate and the superstrate is thus adhesively bonded to the convex face of the substrate. The die 42 may then be raised by retracting cylinder or ram 50 to the position shown in FIG. 3 and the bonded laminate removed.

An adhesive may be applied to either the convex face of the substrate 40 or the confronting face of the superstrate or finish sheet 60. In the preferred method of this invention, the adhesive is applied prior to inserting the substrate in the female die or positioning the superstrate on the support. The adhesive may be applied by spraying the convex face of the substrate 40, prior to insertion in the die cavity, permitting the adhesive to become tacky and providing a continuous operation. A suitable adhesive for bonding a vinyl finish sheet, for example, to a fiberboard substrate would be a water-base latex adhesive, such as "HUGLUE" HC 4457 sold by Hughes Chemical Company. A polyurethane adhesive may be preferred where the finish sheet is a polyurethane film. The adhesive will therefore be dependent upon the material chosen for the finish sheet and the substrate and the particular application for the laminate.

The final steps of the disclosed method then include lowering the upper die 42 to contact the peripheral sealing edge 70 against the flexible sealing sheet 66, retracting support pins 44 and drawing a vacuum through the upper die, drawing the flexible sealing sheet 66 into the die cavity and bringing the superstrate 60 into face to face contact with the convex face of the substrate 40. It will be seen, therefore, that the superstrate of finish sheet 60 may be perforate and that the superstrate is guided into the die cavity by the flexible sealing sheet 66. The sealing sheet however is retained in position by its side edges, accurately locating the finish sheet 60 within the convex face of the substrate 40.

The method of this invention thus eliminates the requirement of a frame or other support and guide means for the finish sheet, eliminating the method step of supporting the finish sheet in a frame assembly and provides a relatively fast, efficient method of bonding the superstrate to the substrate. It will be understood that the disclosed apparatus may be modified depending upon the particular application. The disclosed apparatus was specifically designed for the forming of an automotive headliner laminate, as described above, however the disclosed method may be used for other applications.

I claim:

1. A method of adhesively bonding a flexible superstrate to the inner surface of a concave, semi-rigid, contoured substrate, comprising the steps of:
   a. positioning said superstrate on an essentially horizontal flexible impervious seal;
   b. releasably supporting said contoured substrate with the inner surface thereof facing downwardly in a downwardly facing concave die overlying said flexible superstrate, with said die having a lower peripheral sealing edge overlying said flexible seal and surrounding said superstrate;
   c. applying an adhesive to one of the confronting faces of said substrate and superstrate;
   d. relatively displacing said die and said seal and contacting said die sealing edge and said flexible seal to seal said substrate and said superstrate within a cavity.
   f. drawing a vacuum through said concave die and said substrate, drawing said flexible seal with the superstrate supported thereon into said upper die to place said superstrate into face-to-face contact with the inner concave surface of said contoured substrate, bonding said superstrate to said substrate; and
   g. releasing said substrate and bonded superstrate.

2. The method of adhesively bonding a flexible superstrate to a contoured substrate defined in claim 1, including placing said flexible superstrate on a relatively flat support, said support having a plurality of perforations therethrough and said flexible impervious seal in the form of a flexible sheet overlying said perforations and retained at its edges to said support, including the step of lowering said die into contact with said sealing sheet and drawing said vacuum through said concave die, drawing said flexible sheet into said concave die and drawing said superstrate into bonding face-to-face contact with said substrate.

3. A method of forming a bonded laminate, said laminate comprising a formed concave contoured substrate having a main concave body and a plurality of flexible wings extending downwardly from the main body and a flexible pervious superstrate sheet adhesively bonded to the interior concave surface of the substrate, including the steps of:
   a. applying an adhesive to one face of the laminae to be bonded;
   b. supporting and releasably retaining said contoured substrate with said flexible wings projecting downwardly in a downwardly facing concave cavity of an upper die which includes a peripheral sealing surface;
   c. positioning said flexible pervious superstrate sheet beneath said substrate on a flexible, generally horizontal impervious sealing sheet which includes a portion in vertical alignment with said peripheral sealing surface, said sealing sheet retained at its periphery to a support;
   d. lowering said upper die into sealing contact between said peripheral sealing surface and said sealing sheet, sealing said substrate and superstrate within said die;
   e. releasing said contoured substrate within the sealed chamber defined by said die cavity and said sealing sheet, permitting the substrate to drop slightly within the cavity, yet restraining lateral deflection of the wings by the die cavity;
   f. after the performance of Step e), drawing a vacuum through said upper die and substrate, drawing said flexible sealing sheet into said die cavity and said flexible pervious superstrate into face-to-face contact with said contoured substrate, bonding said laminae into a continuous laminate; and then
   g. releasing said substrate and the bonded superstrate.

4. The method of forming a laminate defined in claim 3, including spraying said substrate with a fluid adhesive and permitting the adhesive to become tacky, prior to inserting said substrate in said upper die.

5. The method of forming a substrate defined in claim 3, wherein said upper die includes a plurality of retractable retainer elements projecting into said die cavity, including inserting said contoured substrate into said die cavity and retaining said substrate on said retainer elements, then releasing said substrate after lowering said die by retracting said retainer elements.

6. A method of adhesively bonding a flexible perforated finish sheet over the concave face of a contoured pervious, concavo-convex automotive headliner substrate, comprising the steps of:
   a. releasably supporting said headliner substrate in a downwardly facing cavity of a contoured female die, said die cavity having a peripheral sealing surface and a concave face conforming to and receiving the convex face of said substrate;
   b. positioning said perforated flexible sheet beneath said substrate on a flexible impervious sealing sheet, said sealing sheet supported and retained at its periphery on a generally planar support having a plurality of perforations therethrough;
   c. applying an adhesive to one of the confronting faces of said perforated contoured substrate and said flexible sheet;
   closing the die to provide a sealed chamber defined by said die cavity and said sealing sheet interiorly of said peripheral sealing surface, with the chamber containing said finish sheet and said headliner substrate;
   e. releasing said contoured substrate within a sealed chamber defined by said die cavity and said flexible seal, permitting the substrate to drop slightly within the cavity, yet restraining lateral deflection of the substrate by the die cavity;
   f. drawing a vacuum through said die cavity and substrate, thereby drawing said sealing sheet into said cavity and said flexible sheet into face-to-face contact with said convex face of said substrate and bonding said flexible sheet to said substrate; and
   g. releasing said headliner substrate and the bonded flexible finish sheet.

7. The method of bonding defined in claim 6, wherein said substrate is supported within said die cavity on retractrable retainer elements extending into said die cavity and said substrate is then released by retracting said retainer elements.

* * * * *